H. GONELLAZ.
Ditching-Machines.
No. 140,820.  Patented July 15, 1873.
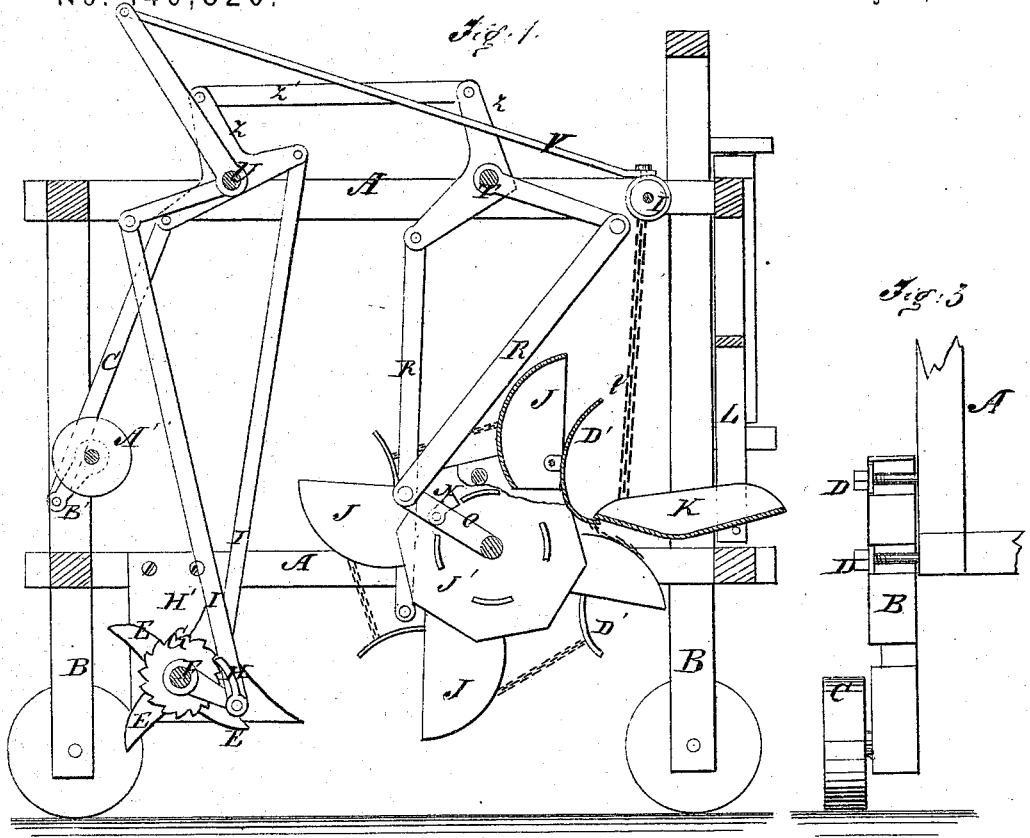
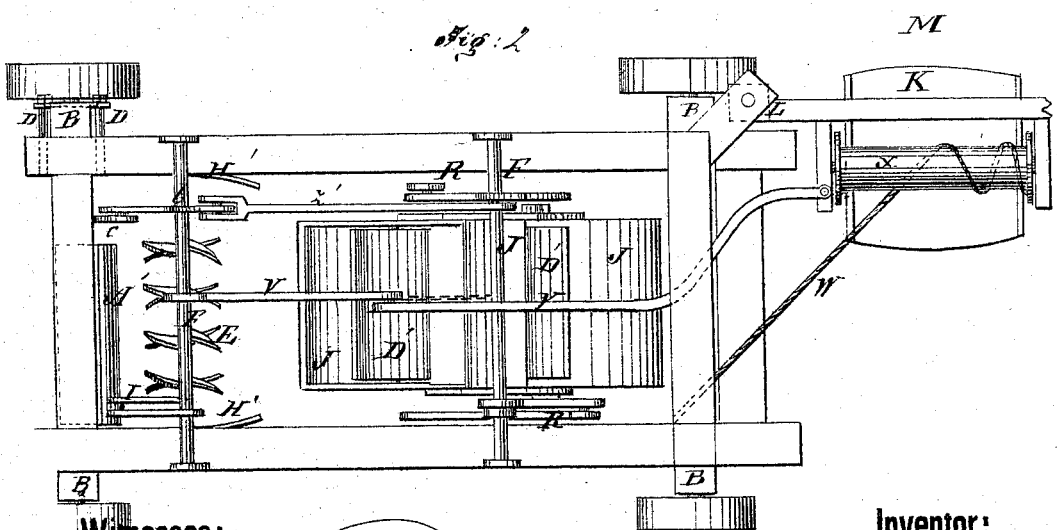
Witnesses:
Chas. Nida
O. Seiquist
Inventor:
H. Gonellaz
Per Munn & Co.
Attorneys.

UNITED STATES PATENT OFFICE.

HYACINTHE GONELLAZ, OF VERMILLIONVILLE, LOUISIANA.

IMPROVEMENT IN DITCHING-MACHINES.

Specification forming part of Letters Patent No. 140,820, dated July 15, 1873; application filed May 31, 1873.

CASE B.

*To all whom it may concern:*

Be it known that I, HYACINTHE GONELLAZ, of Vermillionville, in the parish of Lafayette and State of Louisiana, have invented a new and Improved Ditching-Machine, of which the following is a specification:

My invention consists of a series of intermittingly-rotating colters preceding a rotating-wheel with spoons or buckets, behind which is a receiving and discharging pan, combined in a portable machine, and provided with operating devices, all so contrived that as the machine advances along the ground the cutters loosen and even up the ground, the buckets raise and discharge it into the pan, and the pan discharges it on the bank at one side of the ditch. The machine is mounted on the truck so as to be lowered down to the work while the truck runs along the surface of the ground. The operating devices are set in motion by a drum, which is turned by a rope unwound from it by the team pulling in the direction in which the machine moves, and also moving the machine, the too rapid motion of which is prevented by a stationary vertical steel plate at each end of the colter-shaft, which scrape or cut down the sides of the ditch and throw the earth cut off in front of the buckets.

Figure 1 is a longitudinal sectional elevation of my improved ditching-machine. Fig. 2 is a plan view, and Fig. 3 is a partial end view.

Similar letters of reference indicate corresponding parts.

A represents the frame of the machine mounted on standards B, with truck-wheels C, so that it can be shifted up and down by shifting the bolts D. E represents the colters, which are mounted low down at the front of the machine on the shaft F, which has intermittent rotary motion imparted to it by the ratchet-wheels G, pawls H, and rods I. H' represents the vertical stationary steel plates between which the colters work, the shaft F being mounted in them. These plates cut down the sides of the ditch, and by their curved rear parts (see Fig. 2) scrape the earth into the path of the rotating scoop-buckets J, mounted on the wheel J', behind the colters, which take up the loose earth, carry it over, and deliver it into the pan K at the rear side. This pan is mounted on the carrier L, pivoted at one of the rear corners of the machine, so as to swing the pan around to the position represented in Fig. 2, where it dumps the contents out at the side M on the ground. The bucket-wheel is worked by the pawls N, levers O, connecting-rods R, and rock-shaft T. The crane is swung back and forth by the rod V and rock-shaft U. The pan is dumped by the check-rope W, roller X, and chain Y. The rock-shafts U T are connected together by arms Z and rods Z'. The rock-shafts are worked by the roller A', which is connected to the arm of rock-shaft U by the crank B' and rod C'. The roller is turned by a rope unwound from it by the team, which is hitched to the rope, and pulls the machine along at the same time that it turns the roller.

The plates H' prevent the machine from moving too fast; but, if necessary, an escapement, similar to the escapement of a clock, may be used to regulate its motion.

The buckets J have a tilting spoon, D', in each one, which is thrown out by the pan K, to facilitate the discharging of the earth from the buckets.

The discharging-pan moves out and back during two movements of wheel J', which presents a bucket to the pan each time it moves back.

Having thus described my invention, I claim as new and desire to secure by Letters Patent—

1. The combination of the rotating colters, the rotating bucket-wheel, and the discharging-pan, the colters being arranged in advance of the bucket-wheel, as described.

2. The combination, with the bucket-wheel of a ditching-machine, of a discharging-pan arranged on a crane so as to swing around and discharge at the side of the ditch, substantially as specified.

3. The combination of the stationary cutters H' with rotating colters, arranged between them, substantially as specified.

4. The mode of operating the machine, and also moving it along the ground by the unwinding of a rope having the power applied to it from a roller mounted on the machine and connected with the operating parts so as to work them, the forward movement of the machine being controlled or checked by cutters H', or other regulating apparatus, substantially as specified.

HYACINTHE GONELLAZ.

Witnesses:
M. F. RIGUES,
A. J. MOSS.